US00RE48323E

(19) United States
(12) Reissued Patent
Conroy et al.

(10) Patent Number: US RE48,323 E
(45) Date of Reissued Patent: Nov. 24, 2020

(54) MEDIA PROCESSING METHOD AND DEVICE

(71) Applicant: Apple Inc., Cupertino, CA (US)

(72) Inventors: David G. Conroy, El Granada, CA (US); Steve Schell, San Mateo, CA (US); Barry Corlett, Brisbane, CA (US); Niel D. Warren, Soquel, CA (US); Aram Lindahl, Menlo Park, CA (US)

(73) Assignee: Apple Ine., Cupertino, CA (US)

(21) Appl. No.: 16/190,506

(22) Filed: Nov. 14, 2018

Related U.S. Patent Documents

Reissue of:
(64) Patent No.: 8,713,214
Issued: Apr. 29, 2014
Appl. No.: 13/745,480
Filed: Jan. 18, 2013

U.S. Applications:
(62) Division of application No. 13/222,871, filed on Aug. 31, 2011, now Pat. No. 8,359,410, which is a division
(Continued)

(51) Int. Cl.
*G06F 13/28* (2006.01)
*G06K 9/54* (2006.01)
(Continued)

(52) U.S. Cl.
CPC ..... *G06F 17/00* (2013.01); *G06F 1/3203* (2013.01); *G06F 1/3237* (2013.01);
(Continued)

(58) Field of Classification Search
CPC . G06F 1/1626; G06F 3/16; G06F 5/06; G06F 5/16; G06F 9/3824; G06F 9/3879;
(Continued)

(56) References Cited

U.S. PATENT DOCUMENTS 5,384,890 A 1/1995 Anderson et al.
5,442,789 A * 8/1995 Baker ..... G06F 9/4411 712/35
(Continued)

FOREIGN PATENT DOCUMENTS

EP 0668700 A 8/1995
EP 1785811 A 5/2007
(Continued)

OTHER PUBLICATIONS

AT&T DSP3210 Data Sheet ["AT&T DSP3210 Digital Signal Processor—The Multimedia Solution," Mar. 1993, AT&T Microelectronics (Year: 1993).*
(Continued)

*Primary Examiner* — Christopher E. Lee
(74) *Attorney, Agent, or Firm* — Blank Rome LLP

(57) ABSTRACT

A media processing system and device with improved power usage characteristics, improved audio functionality and improved media security is provided. Embodiments of the media processing system include an audio processing subsystem that operates independently of the host processor for long periods of time, allowing the host processor to enter a low power state while the audio data is being processed. Other aspects of the media processing system provide for enhanced audio effects such as mixing stored audio samples into real-time telephone audio. Still other aspects of the media processing system provide for improved media security due to the isolation of decrypted audio data from the host processor.

7 Claims, 6 Drawing Sheets

Related U.S. Application Data of application No. 12/185,656, filed on Aug. 4, 2008, now Pat. No. 8,041,848.

(51) Int. Cl.

| | |
|---|---|
| ***G06F 17/00*** | (2019.01) |
| ***G06F 1/3203*** | (2019.01) |
| ***G06F 1/3237*** | (2019.01) |
| ***G06F 1/3287*** | (2019.01) |
| ***G06F 1/3293*** | (2019.01) |
| ***G06F 13/12*** | (2006.01) |
| ***G06F 21/10*** | (2013.01) |
| ***G06F 21/71*** | (2013.01) |

(52) U.S. Cl.

CPC ..... *G06F 1/3287* (2013.01); *G06F 1/3293* (2013.01); *G06F 13/124* (2013.01); *G06F 21/10* (2013.01); *G06F 21/71* (2013.01); *G06F 2221/0735* (2013.01); *Y02D 10/122* (2018.01); *Y02D 10/128* (2018.01); *Y02D 10/171* (2018.01); *Y02D 50/20* (2018.01)

(58) Field of Classification Search

CPC ..... G06F 9/4411; G06F 9/4887; G06F 16/24568; G06Q 10/10; G10L 25/00; G11B 19/02; G11B 20/10527; G11B 20/1833; H04M 1/6016; H04M 1/6066; H04H 60/04; H04J 3/12; H04L 1/0083; H04N 7/142; H04S 3/00

USPC ..... 710/13, 29, 53, 316; 455/403, 550.1, 455/556.2; 348/14.08, 425.3; 381/17, 381/107, 119; 709/213, 226; 370/450, 370/466; 360/63; 386/353; 718/107; 712/35; 280/294

See application file for complete search history.

(56) References Cited

U.S. PATENT DOCUMENTS 5,461,266 A 10/1995 Koreeda et al.
5,532,556 A 7/1996 Anderson et al.
5,539,896 A * 7/1996 Lisle ..... G06F 5/16 710/53
5,546,547 A 8/1996 Bowes et al.
5,577,044 A 11/1996 Oxford
5,628,013 A * 5/1997 Anderson ..... G06F 9/4887 718/107
5,647,008 A * 7/1997 Farhangi ..... H04H 60/04 381/119
5,668,601 A 9/1997 Okada et al.
5,689,534 A 11/1997 Anderson et al.
5,696,990 A * 12/1997 Rosenthal ..... G06F 5/06 710/29
5,737,638 A 4/1998 Byrn et al.
5,799,190 A 8/1998 Lynch et al.
5,815,583 A * 9/1998 Solomon ..... H04J 3/12 370/450
5,915,131 A 6/1999 Knight et al.
5,982,459 A * 11/1999 Fandrianto ..... H04N 7/142 348/425.3
6,130,794 A * 10/2000 Christensen ..... G11B 20/1833 360/53
6,134,605 A * 10/2000 Hudson ..... G06F 9/3879 710/13
6,212,199 B1 * 4/2001 Oxford ..... G06F 3/16 370/466
6,343,263 B1 1/2002 Nichols et al.
6,354,748 B1 * 3/2002 Vrvilo ..... G06Q 10/10 348/14.08
6,359,911 B1 3/2002 Movshovich et al.
6,453,409 B1 * 9/2002 Nakamura ..... G06F 9/3824 710/316
6,535,208 B1 3/2003 Saltchev et al.
6,606,388 B1 8/2003 Townsend et al.
6,624,816 B1 9/2003 Jones, Jr.
6,822,654 B1 11/2004 Trivedi et al.
6,920,090 B2 7/2005 Shi et al.
6,954,652 B1 * 10/2005 Sakanashi ..... H04M 1/6016 455/550.1
6,963,987 B1 11/2005 Emons
7,015,921 B1 3/2006 Trivedi et al.
7,119,808 B2 10/2006 Gonzalez et al.
7,305,540 B1 12/2007 Trivedi et al.
7,350,008 B2 3/2008 Borgatti et al.
7,382,333 B2 6/2008 Chen et al.
7,500,022 B2 3/2009 Yang et al.
7,515,810 B2 4/2009 Nagasaka et al.
7,529,948 B2 5/2009 Conroy et al.
7,536,565 B2 5/2009 Girish et al.
7,664,558 B2 2/2010 Lindahl et al.
7,673,238 B2 3/2010 Girish et al.
7,698,739 B2 4/2010 Hasbun
7,711,129 B2 5/2010 Lindahl et al.
7,936,785 B2 * 5/2011 Ehret ..... H04L 1/0083 280/294
7,984,317 B2 7/2011 Conroy et al.
8,099,528 B2 1/2012 Millet et al.
8,359,410 B2 1/2013 Conroy et al.
8,359,411 B2 1/2013 Millet et al.
2004/0005068 A1 * 1/2004 Zeevi ..... H04S 3/00 381/107
2004/0123118 A1 6/2004 Dahan et al.
2005/0181826 A1 * 8/2005 Yueh ..... G06F 1/1626 455/556.2
2005/0201572 A1 9/2005 Lindahl et al.
2005/0221810 A1 10/2005 Hasbun
2006/0008180 A1 * 1/2006 Wakeland ..... 382/303
2006/0067535 A1 3/2006 Culbert et al.
2006/0067536 A1 3/2006 Culbert et al.
2006/0274905 A1 12/2006 Lindahl et al.
2007/0083467 A1 4/2007 Lindahl et al.
2007/0123192 A1 * 5/2007 Sinai ..... H04M 1/6066 455/403
2007/0130383 A1 6/2007 Daham et al.
2007/0157268 A1 7/2007 Girish et al.
2007/0174412 A1 * 7/2007 Araki ..... G11B 19/02 709/213
2007/0198870 A1 8/2007 Cheng et al.
2007/0260779 A1 11/2007 Mora et al.
2007/0288635 A1 * 12/2007 Gu ..... G06F 16/24568 709/226
2008/0030509 A1 2/2008 Conroy et al.
2008/0075296 A1 3/2008 Lindahl et al.
2008/0145028 A1 * 6/2008 Nakamuta ..... G11B 20/10527 386/353
2008/0162739 A1 7/2008 Krah et al.
2008/0181417 A1 * 7/2008 Pereg ..... G10L 25/00 381/17
2009/0003115 A1 1/2009 Lindahl et al.
2009/0005891 A1 1/2009 Batson et al.
2009/0006488 A1 1/2009 Lindahl et al.
2009/0006671 A1 1/2009 Batson et al.
2009/0060472 A1 3/2009 Bull et al.
2009/0079746 A1 3/2009 Howard et al.
2009/0083047 A1 3/2009 Lindahl et al.
2009/0248910 A1 10/2009 Conroy et al.
2009/0248911 A1 10/2009 Conroy et al.
2010/0060792 A1 3/2010 Corlett et al.
2010/0063825 A1 3/2010 Williams et al.
2010/0064113 A1 3/2010 Lindahl et al.
2010/0082849 A1 4/2010 Millet et al.
2010/0142730 A1 6/2010 Lindahl et al.
2010/0232626 A1 9/2010 Paquier et al.

FOREIGN PATENT DOCUMENTS

EP 1806660 A 7/2007
KR 10-2002-0007294 A 2/2002

(56) References Cited

FOREIGN PATENT DOCUMENTS

| | | | |
|---|---|---|---|
| KR | 10-1995-0035449 | A | 6/2011 |
| WO | WO0139164 | A1 | 5/2001 |
| WO | 2009/124127 | | 10/2009 |

OTHER PUBLICATIONS

PCT Search Report.
PM7830 BRIC—Baseband Radio Interface Controller, 2005, PMC-Sierra, Inc.
Korean Office Action dated Jul. 21, 2011.
EPO EXamination Report dated Aug. 24, 2012.
Korean Office Action dated Feb. 20, 2012.
KR Search Report.

* cited by examiner

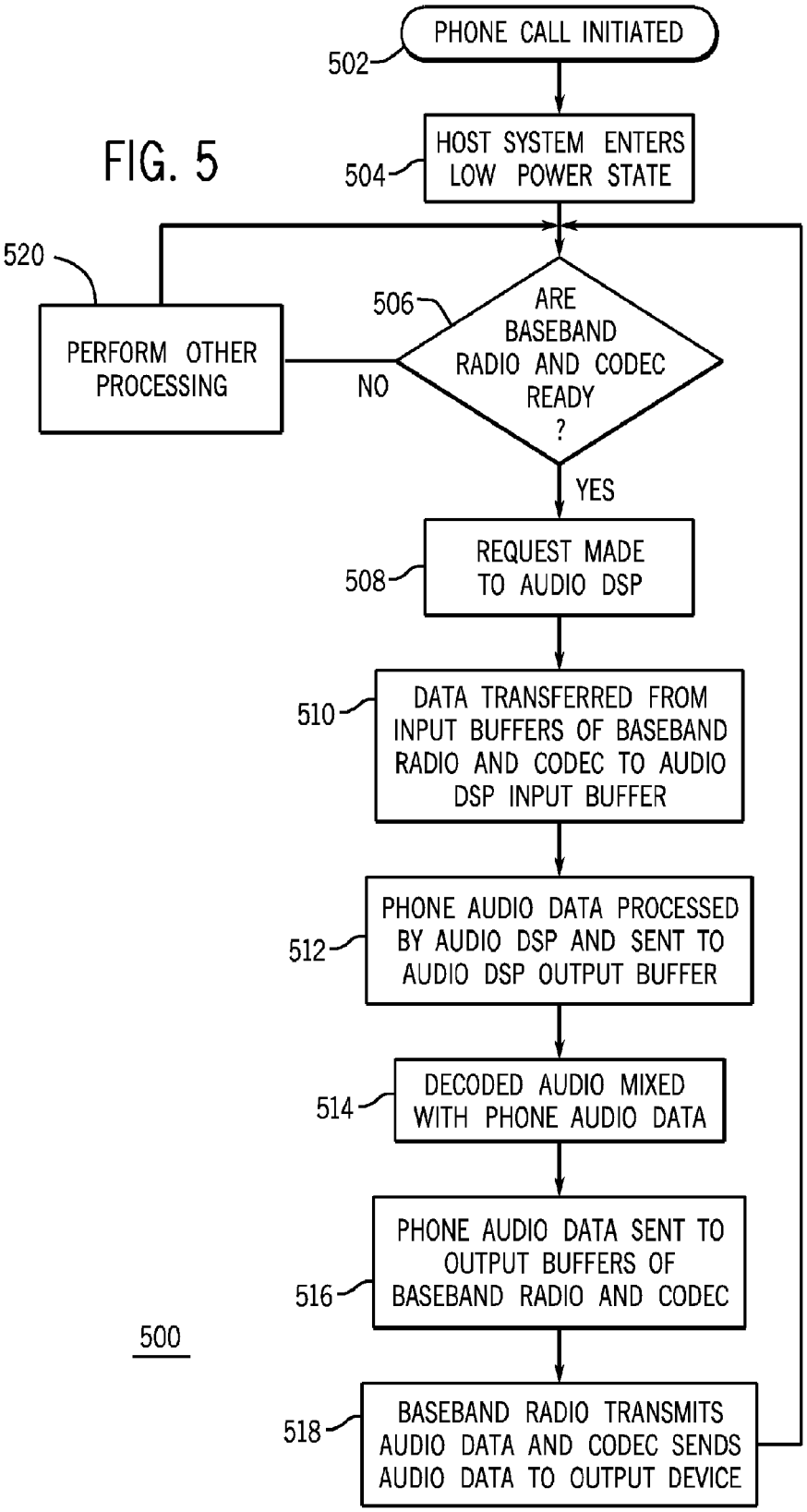
FIG. 5
PHONE CALL INITIATED
502
HOST SYSTEM ENTERS LOW POWER STATE
504
520
PERFORM OTHER PROCESSING
506
ARE BASEBAND RADIO AND CODEC READY ?
NO
YES
REQUEST MADE TO AUDIO DSP
508
DATA TRANSFERRED FROM INPUT BUFFERS OF BASEBAND RADIO AND CODEC TO AUDIO DSP INPUT BUFFER
510
PHONE AUDIO DATA PROCESSED BY AUDIO DSP AND SENT TO AUDIO DSP OUTPUT BUFFER
512
DECODED AUDIO MIXED WITH PHONE AUDIO DATA
514
PHONE AUDIO DATA SENT TO OUTPUT BUFFERS OF BASEBAND RADIO AND CODEC
516
500
BASEBAND RADIO TRANSMITS AUDIO DATA AND CODEC SENDS AUDIO DATA TO OUTPUT DEVICE
518

MEDIA PROCESSING METHOD AND DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is a divisional of U.S. patent application Ser. No. 13/222,871 entitled "Media Processing Method and Device," filed Aug. 31, 2011, which is a divisional of U.S. Pat. No. 8,041,848 entitled "Media Processing Method and Device," filed Aug. 4, 2008, the entirety of which is incorporated by reference herein for all purposes.

BACKGROUND OF THE INVENTION

1. Field of the Invention

The present invention relates generally to electronic devices and, more specifically, to processing of audio in an electronic device.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The trend in consumer electronics is to combine multiple functionalities into a single portable electronic device. For example, cell phones and media players are no longer merely distinct devices, each with their own unique capabilities. Rather, cell phone and media player functionalities can now be merged into one multimedia device with a multitude of capabilities. Modern cell phone/media players are often packed with dozens of additional features which include: playing of audio and video, taking of still pictures, recording video, playing video games, GPS navigation, web surfing, downloading of streaming media from the Internet, Bluetooth and WiFi communications, emailing, text messaging, etc.

One advantage of combining all of these features into one device is that it eliminates the need to carry multiples devices. From an economic standpoint, combined devices also reduce overall cost to the consumer because the electronics that make up the device are used for multiple applications rather than having duplicate electronics with specialized functions. Additionally, by combining an array of electronics with a variety of capabilities it may be possible to provide cross-functionality, in which one device takes advantage of the capabilities of another device.

Typically, the added functionality of a multimedia device is controlled by a central processing unit (CPU) that has direct access to all of the features provided in the device. For example, in the case of processing stored music, a CPU may directly control the routing of data between various components such as memory, digital signal processors, decoders and media playing circuitry. In this type of design, most data, including copyright protected media such as music or music videos, will eventually pass through the CPU for processing and routing. The drawback of this type of design is that the CPU is continually powered up, active and consuming battery power.

Additionally, the telephone audio in a typical multimedia device may be processed by dedicated circuitry rather than the CPU. Generally, telephone audio uses dedicated circuitry to guarantee a hard upper bound on real-time delay, both to comply with the various regulations that bear upon telephones, and to avoid delays that degrade the user experience. This may mean that dedicated circuitry is used to process telephone audio so that telephone audio can bypass the CPU. The circuitry dedicated to the processing of telephone audio is typically very simple, limited to equalization and routing functions. The drawback of this approach is that simplicity of the telephone processing circuitry limits the type of electronic enhancements of telephone audio that might otherwise be possible.

Another drawback of combining multiple capabilities in one device is that as multimedia devices become more functional, the risk of unauthorized copying and distribution of copyright material becomes greater. For example, a multimedia device that is capable of downloading music and/or videos from the Internet can also potentially store the media onto internal memory or an external device and redistribute the media via email or other Internet communication medium as well as by hard copy. Encryption of copyrighted material may help to make such material less susceptible to illegal copying; however, in the typical multimedia device decrypted media may eventually become available to the CPU and, therefore, vulnerable to illegal copying and distribution.

Thus, typical multimedia or audio devices of the prior art include a CPU that is directly coupled to all of the audio components, including a digital signal processor (DSP) and peripheral input/output devices. In a typical prior art device, the CPU would be directly involved in many of the process steps for processing audio, including routing encoded or compressed data to a digital signal processor, receiving the uncompressed data from the DSP and routing the uncompressed audio to a peripheral device.

It may be advantageous, therefore, to provide a multimedia device with an audio subsystem that is not directly controlled by the CPU. It would also be advantageous to provide a device that processes a wide variety of media and takes advantage of the enhanced capabilities that a multimedia device can provide, but, at the same time, provides optimal performance of a dedicated device. For example, it may be advantageous to provide a multimedia device that combines the capabilities of an audio player and a cell phone, but also consumes very low power while operating as an audio player or a cell phone. Additionally, it may be advantageous to provide a multimedia device with enhanced copyright protection that prevents users from illegally distributing copyright protected material.

SUMMARY

Embodiments of the present invention are directed toward a multimedia device with an independent audio subsystem that is loosely coupled to a central processing unit (CPU.) In other words, rather than having audio components directly coupled to a main bus, as in the prior art, all of the audio components are coupled together separately through an independent audio bus to form an independent audio subsystem. The coupling between the host subsystem and the independent audio subsystem is accomplished through one or more data buffers that allow one way communication of data to or from the host subsystem and the audio subsystem. The audio subsystem is independent in the sense that it does not need to further interact with the CPU to accomplish the playing of audio data sent to it from the CPU. Rather, when the CPU sends audio to the audio subsystem, the audio subsystem handles all of the further processing and routing of the audio. Therefore, the audio subsystem receives encoded data from the CPU as though the audio subsystem were an output device.

Further, embodiments of the present invention are directed toward a multimedia device with an independent audio subsystem that handles all of the decoding, mixing, equalizing and routing of the audio signals, and then sends the output audio directly to peripheral output devices. Because the audio subsystem handles all of the processing of audio data, the CPU is not needed beyond the stage of routing audio data to the audio subsystem; therefore, the CPU and the rest of the host subsystem may be configured to enter a low power state while audio data is processed. The system may also be configured so that decryption of protected media occurs during the transfer of audio data from the host DMA controller to the audio subsystem. In addition, the audio subsystem may be configured so that a digital signal processor (DSP) handles the routing, equalizing, and mixing of telephone audio data, and also blends other audio samples into telephone audio.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein:

FIG. 5 is a flow chart of a method for processing telephone audio in accordance with an embodiment of the present invention.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
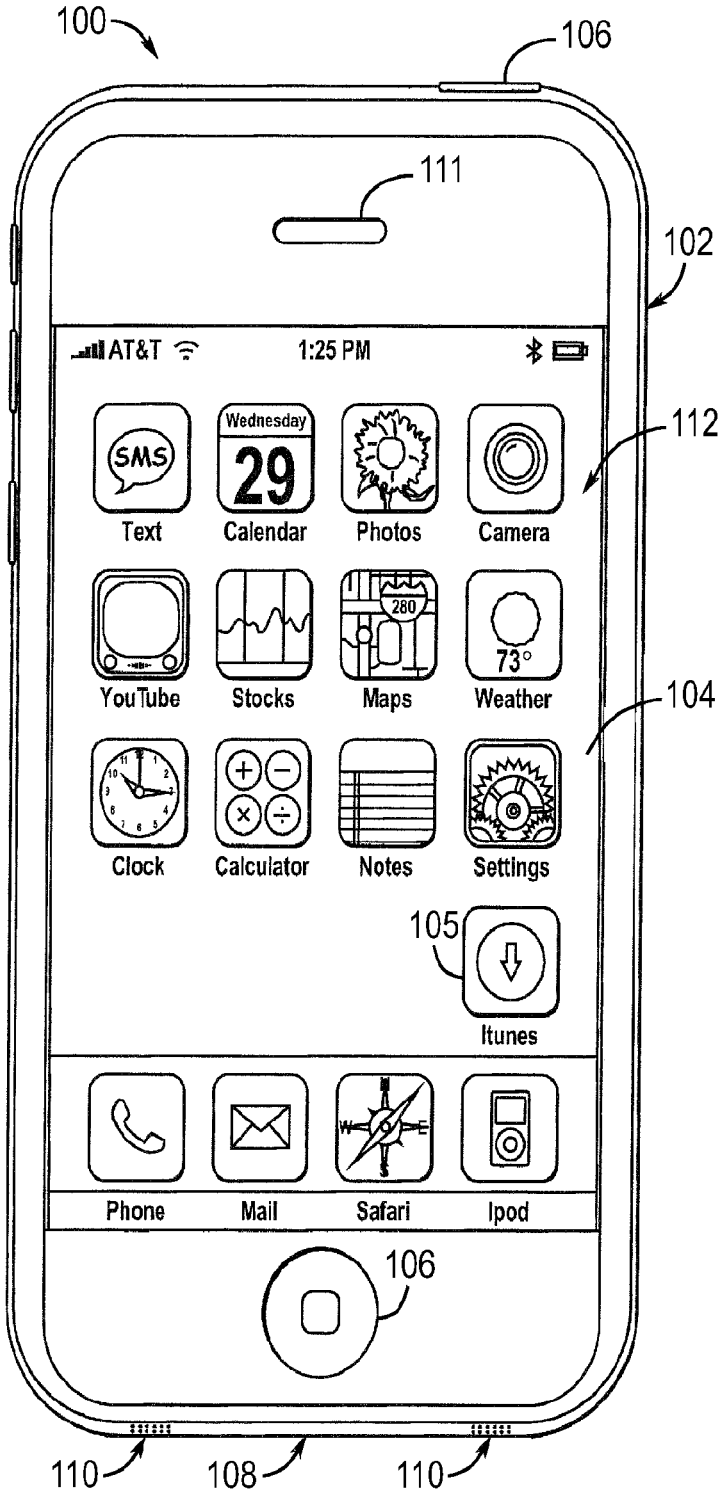
FIG. 1 is a perspective view of a portable electronic multimedia device in accordance with an embodiment of the present invention.

Turning now to the figures, FIG. 1 depicts an electronic device 100 in accordance with one embodiment of the present invention. In some embodiments, the electronic device 100 may be a media player for playing music and/or video, a cellular phone, a personal data organizer, or any combination thereof. Thus, the electronic device 100 may be a unified device providing any one of or a combination of the functionality of a media player, a cellular phone, a personal data organizer, and so forth. In addition, the device 100 may allow a user to connect to and communicate through the Internet or through other networks, such as local or wide area networks. For example, the electronic device 100 may allow a user to communicate using e-mail, text messaging, instant messaging, or using other forms of electronic communication. By way of example, the electronic device 100 may be a model of an iPod® having a display screen or an iPhone® available from Apple Inc.

In certain embodiments the electronic device 100 may be powered by a rechargeable or replaceable battery. Such battery-powered implementations may be highly portable, allowing a user to carry the electronic device 100 while traveling, working, exercising, and so forth. In this manner, a user of the electronic device 100, depending on the functionalities provided by the electronic device 100, may listen to music, play games or video, record video or take pictures, place and take telephone calls, communicate with others, control other devices (e.g., the device 100 may include remote control and/or Bluetooth functionality), and so forth while moving freely with the device 100. In addition, in certain embodiments the device 100 may be sized such that it fits relatively easily into a pocket or hand of the user. In such embodiments, the device 100 is relatively small and easily handled and utilized by its user and thus may be taken practically anywhere the user travels. While the present discussion and examples described herein generally reference an electronic device 100 which is portable, such as that depicted in FIG. 1, it should be understood that the techniques discussed herein may be applicable to any media-processing electronic device, regardless of the portability of the device.

In the depicted embodiment, the electronic device 100 includes an enclosure 102, a display 104, user input structures 106, and input/output connectors 108. The enclosure 102 may be formed from plastic, metal, composite materials, or other suitable materials or any combination thereof. The enclosure 102 may protect the interior components of the electronic device 100 from physical damage, and may also shield the interior components from electromagnetic interference (EMI).

The display 104 may be a liquid crystal display (LCD) or may be a light emitting diode (LED) based display, an organic light emitting diode (OLED) based display, or other suitable display. In accordance with certain embodiments of the present technique, the display 104 may display a user interface 112 as well as various images 105, such as logos, avatars, photos, album art, and so forth. Additionally, in one embodiment the display 104 may be a touch screen through which a user may interact with the user interface. The display 104 may also display various function and/or system indicators to provide feedback to a user, such as power status, call status, memory status, etc. These indicators may be in incorporated into the user interface displayed on the display 104. As discussed herein, in certain embodiments the user interface 112 may be displayed on the display 104, and may provide a means for a user to interact with the electronic device 100. The user interface may be a textual user interface, a graphical user interface (GUI), or any combination thereof, and may include various layers, windows, screens, templates, elements or other components that may be displayed in all of or areas of the display 104.

In one embodiment, one or more of the user input structures 106 are configured to control the device 100, such as by controlling a mode of operation, an output level, an output type, etc. For instance, the user input structures 106 may include a button to turn the device 100 on or off. In general, embodiments of the electronic device 100 may include any number of user input structures 106, including buttons, switches, a control pad, keys, knobs, a scroll wheel, or any other suitable input structures. The input structures 106 may work with a user interface displayed on the device 100 to control functions of the device 100 or of other devices connected to or used by the device 100. For example, the user input structures 106 may allow a user to navigate a displayed user interface or to return such a displayed user interface to a default or home screen.

The user interface 112 may, in certain embodiments, allow a user to interface with displayed interface elements via the one or more user input structures 106 and/or via a touch sensitive implementation of the display 104. In such embodiments, the user interface provides interactive functionality, allowing a user to select, by touch screen or other input structure, from among options displayed on the display 104. Thus the user can operate the device 100 by appropriate interaction with the user interface 112. The user interface 112 may of any suitable design to allow interaction between a user and the device 100. Thus, the user interface 112 may provide windows, menus, graphics, text, keyboards or numeric keypads, scrolling devices, or any other elements. In one embodiment, the user interface 112 may include screens, templates, and UI components, and may include or be divided into any number of these or other elements. The arrangement of the elements of user interface 112 may be hierarchical, such that a screen includes one or more templates, a template includes one or UI components. It should be appreciated that other embodiments may arrange user interface elements in any hierarchical or non-hierarchical structure.

The electronic device 100 may also include various input and output ports 108 to allow connection of additional devices. For example, a port 108 may be a headphone jack that provides for connection of headphones. Additionally, a port 108 may have both input/output capabilities to provide for connection of a headset (e.g. a headphone and microphone combination). Embodiments of the present invention may include any number of input and/or output ports, including headphone and headset jacks, universal serial bus (USB) ports, Firewire (IEEE-1394) ports, and AC and/or DC power connectors. Further, the device 100 may use the input and output ports to connect to and send or receive data with any other device, such as other portable electronic devices, personal computers, printers, etc. For example, in one embodiment the electronic device 100 may connect to a personal computer via a Firewire (IEEE-1394) connection to send and receive data files, such as media files.

The electronic device 100 may also include various audio input and output portions. For example, an input receiver 110 may be a microphone that receives user audio input. Additionally, output transmitter 111 may be a speaker that transmits audio signals to a user. Input receiver 110 and output transmitter 111 may be used in conjunction as audio elements of a telephone.

Figure 2:
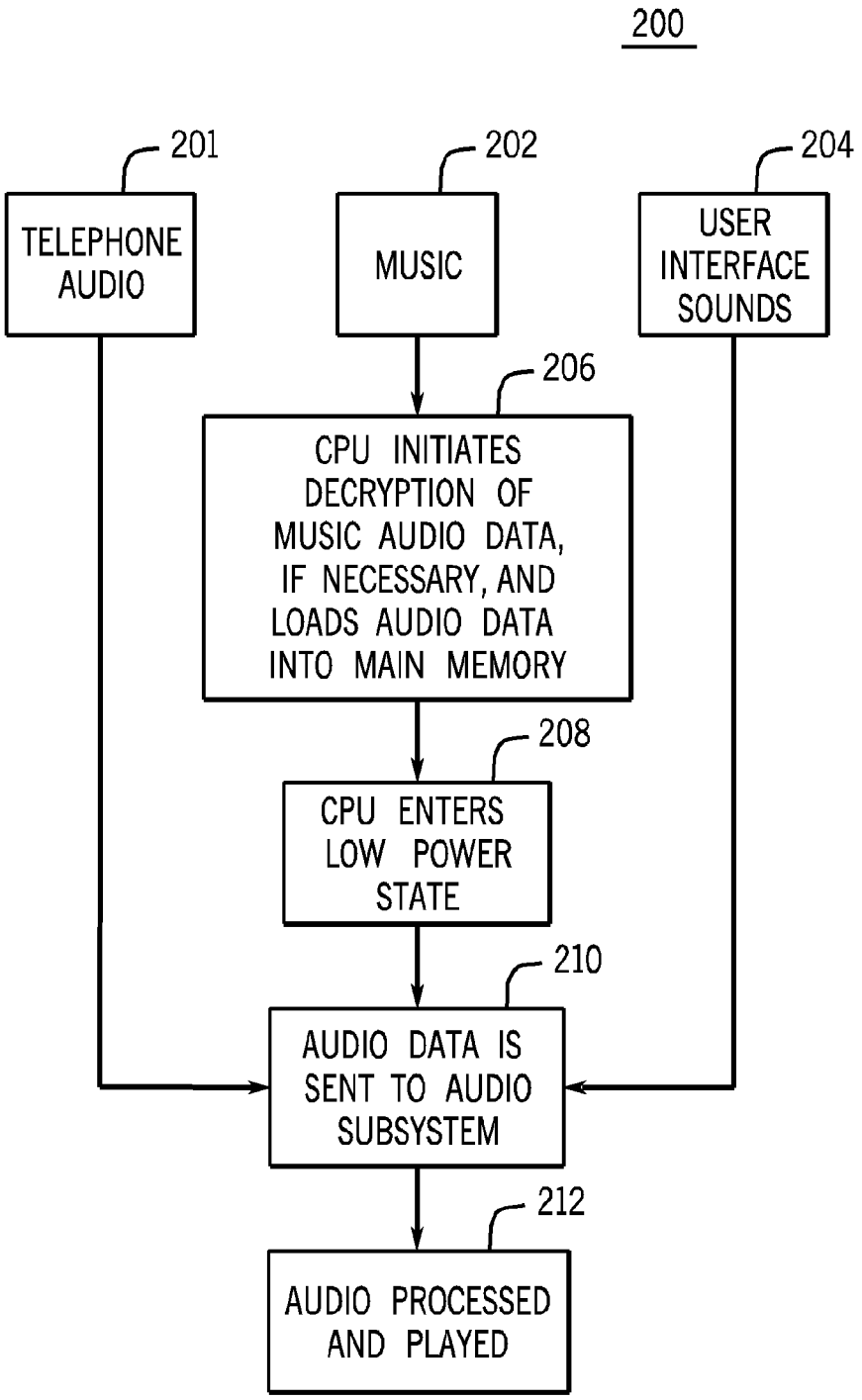
FIG. 2 is allow chart showing a general flow of audio data in accordance with an embodiment of the present invention.
Figure 3:
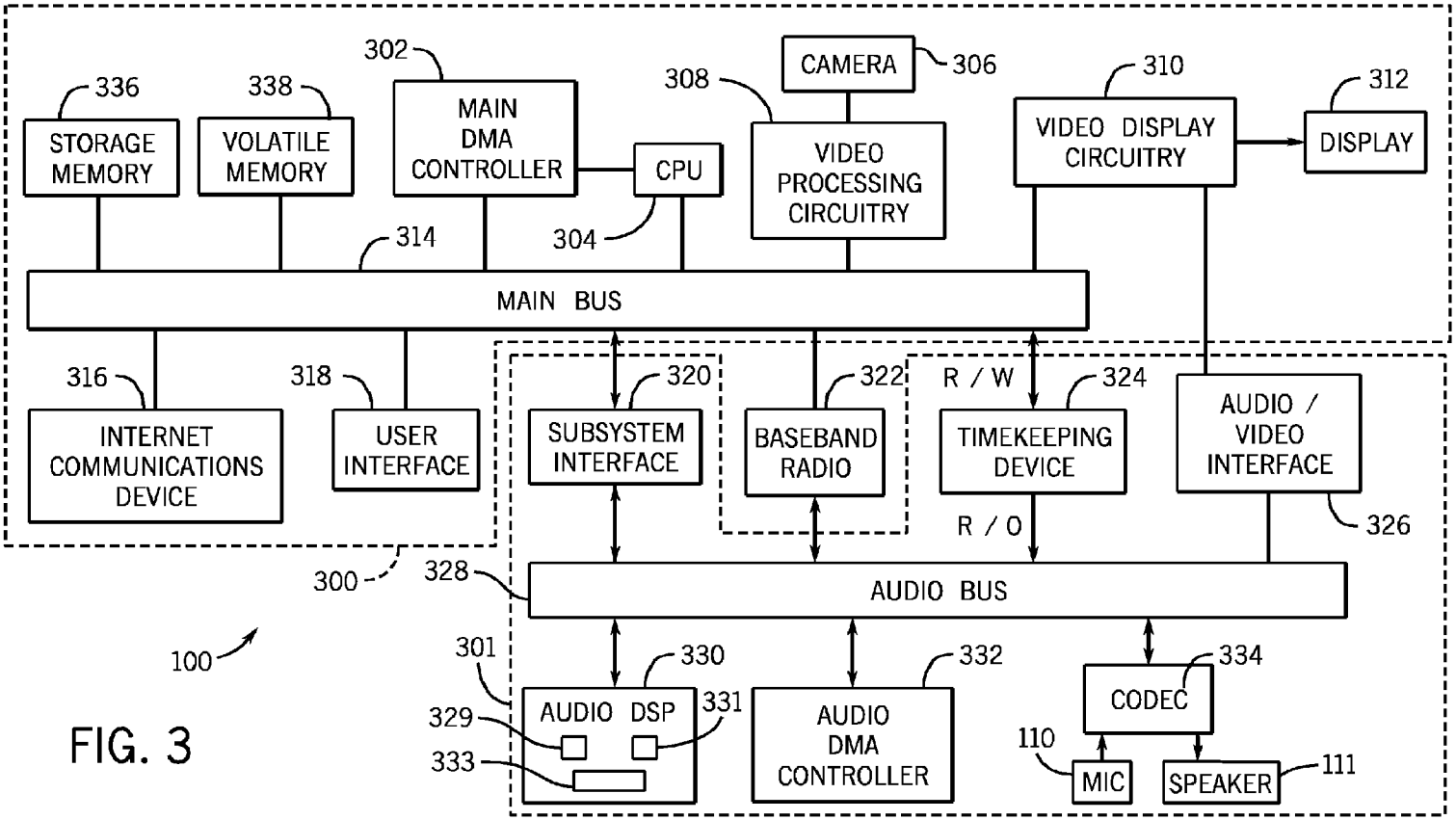
FIG. 3 is a block diagram of a portable electronic multimedia device in accordance with an embodiment of the present invention.

Turning to FIGS. 2 and 3, a diagrammatical representation of data flow in the electronic device 100 in accordance with an embodiment of the present invention is depicted. As shown in FIG. 3, a typical device 100 may include a host subsystem 300 and an audio subsystem 301. In one embodiment, host subsystem 300 and audio subsystem 301 may be parts of a single integrated circuit. In another embodiment, host subsystem 300 and/or audio subsystem 301 may be distributed over one or more integrated circuits. As will be discussed further below, the host subsystem 300 includes a CPU 304, which controls and directs most functions of the device 100 other than audio processing. The audio subsystem 301, on the other hand, controls substantially all of the audio processing functions of the device 100.

As shown in FIG. 2 and discussed in further detail below, some examples of audio signals that may be processed by the audio subsystem 301 include telephone audio 201, music and audio related to an audio/video signal 202, and user interface sounds 204. Some audio data, such as telephone audio 201 and user interface sounds 204, may be processed directly by the audio subsystem 301 with little or no involvement of the CPU 304, as shown in block 210. Other audio signals, however, may be processed by the CPU 304 before being sent to the audio subsystem 301. For example, in block 206, the CPU 304 causes music audio data to be decrypted and loaded into main memory. Next, at step 208, the CPU 304 enters a low power state while audio data is sent to the audio subsystem 301. Finally, at step 212, audio data is processed by the audio subsystem 301 and played, i.e., sent to the appropriate output device.

Because the audio processing at step 212 can take place with little or no involvement of the CPU, the CPU is free to carry out other processing tasks or alternatively to enter a low power state which extends the useful battery life of the electronic device 100. It should also be appreciated that in other embodiments not depicted by FIG. 2, audio data may be processed by the audio subsystem then sent to the CPU via volatile memory 338. For example, the electronic device 100 may include a digital microphone coupled to the audio subsystem, such that audio received through the digital microphone may be processed by the audio subsystem and then sent to the CPU to be processed and/or stored.

Turning now to FIG. 3, a block diagram of a circuitry used in the electronic device 100 is provided. As seen in the block diagram, the electronic device 100 includes a main bus 314 to which most of the peripheral electronic components are communicatively coupled. The main bus 314 may combine the functionality of a direct memory access (DMA) bus and a programmed input/output (PIO) bus. In other words, the main bus 314 may facilitate both DMA transfers and direct CPU read and write instructions. In embodiments of the present invention, the main bus 314 may be one of the Advanced Microcontroller Bus Architecture (AMBA®) compliant data buses.

The electronic device 100 also includes a CPU 304. The CPU 304 may be any general purpose microprocessor known in the art such as a Reduced Instruction Set Computer (RISC) from ARM Limited. The CPU 304 runs the operating system of the electronic device 100 and manages the various functions of the electronic device 100. As such, it may be coupled to the main bus 314 and configured to transmit PIO instructions to the various devices coupled to the main bus 314. Additionally, the CPU 304 may be configured to initiate DMA transfers. In one embodiment, PIO instructions from CPU 304 do not pass directly to the main bus. Rather, as will be explained further below, the CPU 304 is directly coupled to the main DMA controller 302, and PIO instructions issuing from the CPU 304 pass through the main DMA controller 302 to the main bus 314. The CPU 304 may contain one or more caches whose operation may be completely internal to CPU 304, or which may observe and, in some cases, intercept, data transfers passing over main bus 314 that access volatile memory 338. The CPU 304 may include or be coupled to a read-only memory (ROM) (not shown), which may hold the operating system and/or other device firmware that runs on the electronic device 100.

The electronic device 100 may also include a volatile memory 338 electrically coupled to main bus 314. The volatile memory 338 may include, for example, any type of random access memory (RAM), and may also include non-volatile memory devices, such as ROM, EPROM and EEPROM or some combination of volatile and non-volatile memory. Additionally, the volatile memory 338 may also include a memory controller that controls the flow of data to and from the volatile memory 338. In embodiments of the present invention, the volatile memory 338 is used to store compressed video and/or audio files in encrypted form.

Embodiments of the present invention may also include a main DMA controller 302 coupled to the CPU 304 and main bus 314. The main DMA controller 302 may be configured to route data between various devices connected to the main bus 314 including the volatile memory 338. The routing of data within the electronic device 100 may be configured to occur in a variety of ways. For example, the CPU 304 may direct the routing of data through the main DMA controller 302 by creating DMA transfer instructions in the volatile memory 338, commanding DMA controller 302 to begin executing those DMA transfer instructions, and then commanding an I/O device, attached to main bus 314, to send transfer requests, and to transmit and/or receive data from the main DMA controller 302. In alternative embodiments, the CPU 304 may route data directly by passing data through data registers contained in the CPU 304. In other embodiments the electronic device 100 may be implemented without a DMA controller, in which case the CPU 304 may directly control the flow of data through the electronic device 100 through PIO instructions.

In addition to the volatile memory 338, the electronic device 100 may also include a storage memory 336 connected to the main bus 314. The storage memory 336 may include flash memory, such as, for example, NOR or NAND flash memory, but may also include any kind of electronic storage device, such as, for example, magnetic or optical disks. In embodiments of the present invention, the storage memory 336 is used to store software and user files such as phonebook entries, pictures, audio and video files, ring tones, archived text messages and emails, etc.

Also coupled to the main bus 314 is an Internet communications device 316. The Internet communications device 316 may include any method for communicating with the Internet. For example, the Internet communications device 316 may include a wireless communications device operating in accordance with IEEE 802.11 standards or an Ethernet communication device operating in accordance with IEEE 802.3 standards. In some embodiments, Internet communication device 316 may perform only a portion of the task of communication with the Internet; for example, in some embodiments Internet communication device 316 may only be the physical communications link, and the rest of the task of communication with the Internet is performed by software executing on CPU 304.

Also connected to the main bus 314 is a user interface 318. The user interface 318 may include a variety of user interface tools such as, for example, buttons, knobs, touch screens, trackballs or any other user interface known in the art.

Also connected to the main bus 314 are video components, including the video processing circuitry 308, the video display circuitry 310 and the display 312. The video processing circuitry 308 may be configured to compress video data into various formats and send the compressed video data to other parts of the system. For example, the video processing circuitry 308 may be configured to compress video data obtained from camera 306 into a JPEG or MPEG format and send the compressed video data to volatile memory 338 via main bus 314. The video processing circuitry 308 may also be configured to decompress video data of various encoding formats and send the decompressed video data to other parts of the system. For example, the video processing circuitry 308 may be configured to decompress JPEG or MPEG encoded video data obtained from volatile memory 338 and send the decompressed video data to the volatile memory 338 or the video display circuitry 310.

The video display circuitry 310 may be configured to convert the decompressed video data into a video signal that may then be sent to the display 312. The video display circuitry may also be configured to generate video data in a wide range of video formats. For example, the video display circuitry 310 may generate an analog signal such as an NTSC compatible signal or a digital signal such as an ATSC or HDMI compatible signal. Furthermore, the display 312 may be any type of video display device, such as, for example, an LCD screen. In embodiments of the present invention the display 312 is an integral part of the electronic device 100; however, in alternate embodiments, the display 312 may be an external device coupled to the electronic device 100 through a data transfer medium such as an HDMI interface, for example.

Together, the video components 308, 310, and 312 may be used to display various forms of video content. For example, the video components 308, 310, and 312 may be used to display the real-time camera view through the camera 306, or still pictures that have been previously recorded and stored. Additionally, the video components 308, 310, and 312 may be used to display the video portion of a media with both audio and video content. For example, the video components 308, 310, and 312 may be used to process and display audio/video media such as electronic games or broadcast media delivered to the electronic device 100 from any possible source, such as, for example, a broadcast television signal, streaming media from the Internet, or an audio/video file stored in the storage memory 336.

Also connected to the main bus 314 is the data side of the baseband radio 322. The baseband radio 322 transmits and receives wireless telephone signals. The data side of the baseband radio 322 is connected to the host subsystem 300 so that the CPU 304 can directly control various features of the broadband radio 322, such as initiation and termination of incoming or outgoing phone calls, and so that CPU 304 can transmit and receive data over a wireless telephone data service (when doing this, baseband radio 322 has the same role as internet communications device 316). As will be explained in further detail below, the audio side of the baseband radio is connected to the audio bus 328 so that telephone audio can be processed by the audio subsystem independently of the CPU 304. In other words, none of the audio data from the baseband radio passes to the main bus 314.

FIG. 3 also depicts an embodiment of an independent audio subsystem 301 loosely coupled to the host subsystem 300 in accordance of the present invention. The audio subsystem is described as "loosely coupled" because, unlike prior art, the components of the audio subsystem are not directly coupled to the main bus 314 and are neither directly accessible by the CPU 304 nor able to directly access main bus 314. Rather, all of the audio components included in the audio subsystem 301 are coupled to each other through an audio bus 328 that is independent from the main bus 314, and the coupling between the host subsystem 300 and the audio subsystem 301 is accomplished through a set of data lines controlled by an subsystem interface 320, which will be described further below. In embodiments of the present invention, the audio bus 328 may be one of the AMBA® compliant data buses. Additionally, the audio subsystem 301 may also include an audio DMA controller 332 that facilitates DMA transfers within the audio subsystem 301.

Also coupled to the audio bus 328 is the audio side of the baseband radio 322, which includes a transmitter, a receiver and other electronics associated with wireless telephone communications such as, for example, cellular telephone communications. Audio data generated by the baseband radio 322 is processed by the audio subsystem 301 in a manner that will be described below. Embodiments of the present invention may also include other wireless communications devices such as, for example, a Bluetooth compliant wireless device (not depicted).

Also coupled the audio bus 328 is the CODEC 334, which is configured to encode, decode and route data to and from one or more audio input and output devices, such as microphone 110 and speaker 111. Specifically, the CODEC 334 receives analog data from an audio input device such as the microphone 110, converts the analog audio data into digital audio data and sends the digital audio data to an audio DSP 330 through the audio bus 328. Further, the CODEC 334 receives digital audio data from the audio DSP 330, converts the digital audio data into analog audio data and sends the analog audio data to an audio output device such as the speaker 111. In embodiments of the present invention, the CODEC 334 includes two communication channels so that the sending and receiving of audio data, as described above, can occur simultaneously.

The audio DSP 330 includes a core processor 333, such as an ARM® AudioDE™ processor, as well as data memory, program memory, DMA channels, one or more input buffers 329, and one or more output buffers 331. In one embodiment, the audio DSP 330 may be an ARM® r2p0 AMCSS processor. The audio DSP 330 controls the routing of data within the audio subsystem 301 and performs various processing of audio data, such as compression/decompression, equalization and mixing of audio from different sources. In embodiments of the present invention, the audio DSP 330 is configured to switch between various audio processing tasks, with a grain of a few milliseconds, in order to avoid delays that may be unacceptable by regulations and/or undesirable to users of the electronic device 100. For example, the audio DSP 330 may be configured so that if the audio DSP 330 is processing a music audio when the CPU 304 initiates an incoming telephone call, the audio DSP 330 will quickly switch to the processing of real-time telephone audio in order to avoid a delay in the telephone conversation.

The quick switching ability of the audio DSP 330 may be facilitated by the use of a scheduling hardware and scheduling software running in the program memory of the audio DSP 330. In one embodiment, the scheduler breaks each processing task (e.g., decompression of music audio, or equalization of telephone audio) into a series of smaller task segments, each of which can be processed very quickly. The scheduler then determines which task segment is fed to the core processor 333 at any given time. Because the scheduler feeds the core processor 333 with small task segments that are quickly processed, the scheduler does not need to interrupt the core processor 333 to switch the core processor 333 to a different task. Rather, the scheduler waits until the previous small task segment is finished processing before feeding a task segment related to the different task.

Because the most common task performed by the audio DSP 330 will be the decoding and post-processing (for example, equalization) of audio, the typical task segment will be decoding or post-processing of a small segment of audio samples. The number of samples in the small segment may be determined by the audio sampling rate for the particular task, as well as the maximum time delay that can be allowed for the most delay-sensitive task, which will usually be the processing of telephone audio, as delays in real-time conversation are both forbidden by telephone regulations and bothersome to the user. Regarding sampling rate, the typical sampling rates will be approximately 8 kilohertz for telephone audio and 44.1 kilohertz for music. Regarding the maximum allowed time delay, in embodiments of the present invention, the audio subsystem 301 is configured to process real-time audio, such as telephone audio, with a best-case total time delay of 2 milliseconds (ms) from the time the audio signal is received from the microphone or radio receiver to the time the audio signal is played by the speaker or transmitted by the radio transmitter. In other embodiments, up to a 5 ms delay may be acceptable. For example, in some embodiments of the present invention, the total processing time for real-time audio includes a 1 ms delay due to the input device or receiver, a 1 ms delay due to the audio DSP 330, and a 1 ms delay due to the output device or transmitter. Given the above design constraints, the size of the small task segments will typically be around 8 samples when processing telephone audio, and around 44-45 samples when processing music.

Also connected to both the main bus 314 and the audio bus 328 is the subsystem interface 320, which is the main flow path for information flowing between the host subsystem 300 and the audio subsystem 301, including audio data, control commands, status information and initialization information. The subsystem interface 320 may include one or more memory buffers, such as, for example, first-in-first-out (FIFO) buffers or ring buffers, for carrying streaming audio data from the host subsystem 300 to the audio subsystem 301. Furthermore, although the subsystem interface 320 may include a single output buffer channel that carries data from the host subsystem 300 to the audio subsystem 301, the subsystem interface 320 may also include a plurality of buffer channels, including at least one input buffer channel that carries data from the audio subsystem 301 to the host subsystem 300. In one embodiment, the subsystem interface 320 includes four buffer channels that can be individually configured as input or output and are usually configured as three output buffer channels and one input buffer channel. By providing more than one buffer channel to carry data to the audio subsystem 301, streaming audio, such as music audio, can be kept separate from user interface sounds. The subsystem interface 320 may also include one or more electronic registers, used to carry control information from the CPU 304 to the audio subsystem 301 and to carry status information from the audio subsystem 301 to the CPU 304. Both the CPU 304 and the audio DSP 330 may have read/write access to these registers.

Additionally, the audio subsystem 301 may also include an amount of audio RAM, or other form of electronic data storage, sufficient to temporarily store a significant quantity of streaming audio data in either compressed or un-compressed format that has been sent by host subsystem 300 and is waiting to be processed by the audio DSP 330. In some embodiments, the audio RAM may be included in the subsystem interface 320. In other embodiments, the audio RAM may be included in the audio DSP 330, in which case the input buffer 329 and the output buffer 331 may be included in the audio RAM. In yet other embodiments, the audio RAM may be a separate component coupled to the audio bus 328. By providing an audio RAM to temporarily store streaming audio, the host subsystem 300 can go into a low power mode while the audio DSP continues to process audio data, as will be explained in more detail below. In some embodiments, the audio subsystem 301 may include a relatively small amount of audio RAM, on the order of ten kilobytes or less. In other embodiments, the audio subsystem 301 may include several hundred kilobytes of audio RAM. It will be appreciated that increasing the amount of audio RAM included in the audio subsystem 301 will increase the length of time the host subsystem 300 can remain in low power mode. In some embodiments, the audio RAM may hold the equivalent of ten to thirty seconds worth of audio data.

Additionally, a means of synchronizing audio data with video data is provided. Synchronization of audio and video data may be desirable because, in embodiments of the present invention, the audio and video components of an audio/video signal are processed separately. Specifically, the video component of an audio/video signal is sent to the video processing circuitry 308, while the audio component of the audio/video signal is sent to the audio subsystem 301. Furthermore, once audio data is sent to the audio subsystem 301, the CPU 304 is unable to retrieve or manipulate the audio data. Rather, audio data processed by the audio DSP 330 may be played by sending the audio signal to the CODEC 334 or some other audio output device within the audio subsystem 301 such as an S/PDIF output or the audio/video interface 326. Therefore, without a means to synchronize the playing of audio and video data, the unequal processing times that may exist between the audio processing circuitry and the video processing circuitry could cause the video component to play out of synch with the audio component.

To make it possible for software running on the host subsystem 300 and the audio processing subsystem 301 to ensure that the audio and video components of an audio/video signal play with the correct timing, a timekeeping device 324 is connected to both the main bus 314 and the audio bus 328. The timekeeping device 324 may include a master timebase, a register that increments continuously at a constant frequency. Both the host subsystem 300 and the audio subsystem 301 have access to the time information generated by the timekeeping device 324. This timing information may then be used to synchronize audio output with video output when the electronic device 100 is generating audio/video output. For example, the audio component of an audio/video may be encoded with a timestamp before being sent to the audio subsystem 301. The timestamp would inform the audio subsystem 301 of the appropriate time to play the segment of audio, with the master timebase serving as the authoritative source of the current time. For another example, timing information may be read from the timekeeping device 324 and written to a data register in the subsystem interface 320 when audio samples corresponding to interesting points in an audio stream are delivered to CODEC 334. The timing information may then inform the CPU 304 of the time that a particular audio sample has been played by the CODEC 334.

The audio/video interface 326 provides a means for recombining the processed audio and video in embodiments in which the audio/video signal is sent to a display device that can utilize a combined audio/video signal. For example, the audio/video interface 326 may convert the audio data into a High-Definition Multimedia Interface (HDMI) format. Audio data sent through the audio/video interface 326 to the video display circuitry 310 may include timing information read from the timekeeping interface 324. Because this timing information is common to both the host subsystem 300 and the audio sub-system, the information can be used to synchronize the audio and video signals.

It should be noted that various configurations and capabilities of the electronic device 100 may be utilized in accordance with embodiments of the present invention. As an example, embodiments of the present invention may be configured without the video processing circuitry 308, the video display circuitry 310, or the display 312. Additionally, embodiments of the present invention may support a variety of input media such as Ethernet or USB. Regarding the audio subsystem 301, the electronic device 100 may include, among other things, a digital microphone connected to the audio bus 328, configured to allow a user to record audio samples or voice commands. Although it is beyond the scope of the present description to detail every possible combination of components that may be included in the electronic device 100 and the audio subsystem 301, it will be appreciated by those of ordinary skill in the art that various other components may be added or eliminated without deviating from the spirit and scope of the present invention. It should also be noted that some or all of the components described in FIG. 3 may be implemented in a system on a chip (SOC). Furthermore, in some embodiments, the audio subsystem may be implemented in its own separate chip.

Additionally, it will also be appreciated that certain embodiments may also include the processing of other types of media, such as video, within a loosely coupled subsystem. For example, the video processing circuitry 308, camera 306, video display circuitry 310 and display 312 may be coupled together by a video bus to form a second subsystem which communicates with the host subsystem 300 through a second subsystem interface located between the main bus 314 and the video bus. For another example, the video and audio components may all be included in the audio subsystem 301, in which case the audio subsystem 301 may actually be an audio/video subsystem. For convenience, the present application describes an electronic device with a loosely coupled audio subsystem 301. It will be understood, however, that embodiments of the present invention also apply to a device with a loosely coupled video subsystem.

Figure 4:
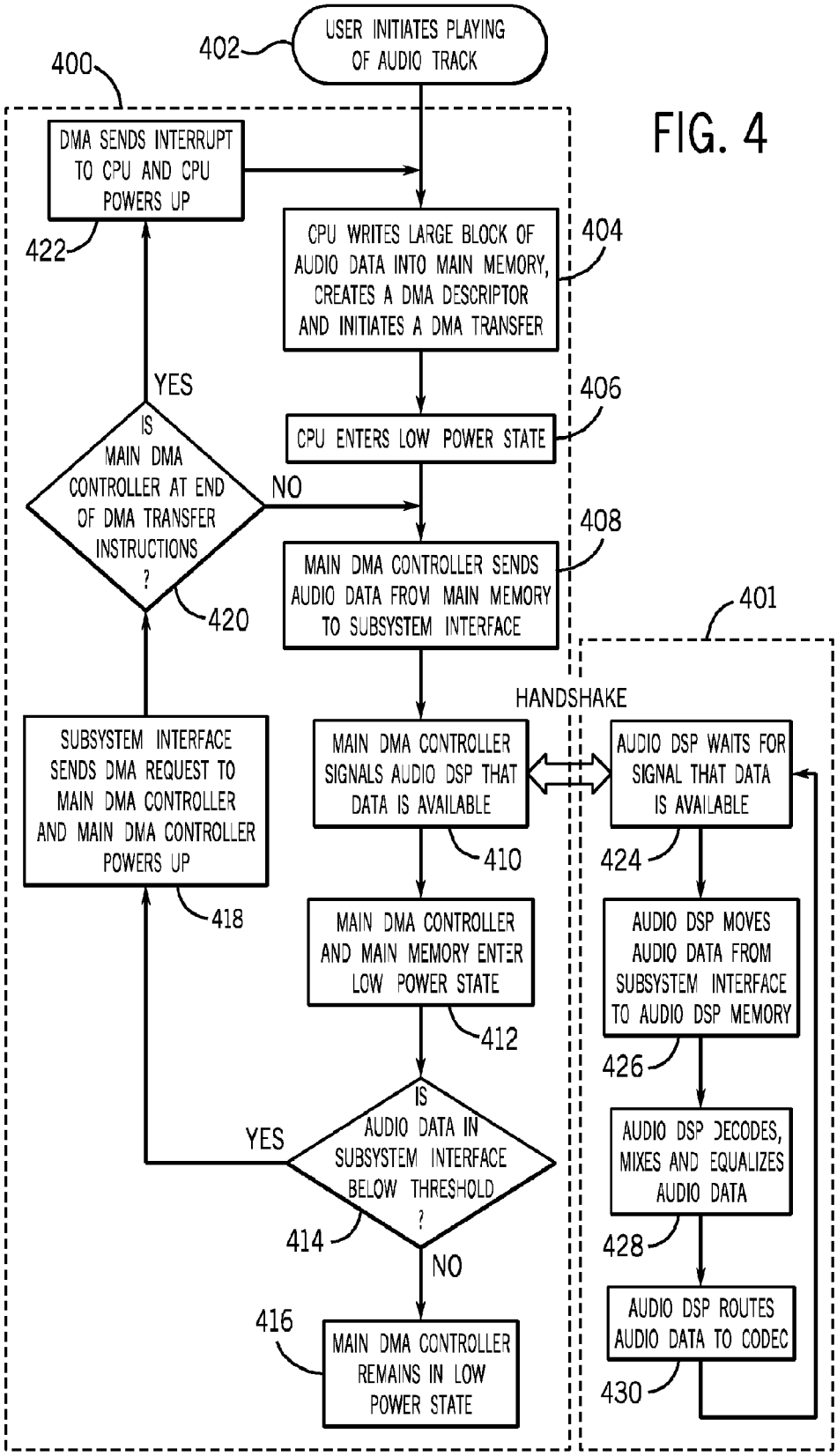
FIG. 4 is a flow chart of a method for processing music audio in accordance with an embodiment of the present invention.

Turning now to FIG. 4, a method for processing music audio in accordance with an embodiment of the present invention is depicted. The described embodiment includes two parallel processes, process 400 and process 401, which are substantially independent from one another. Process 400 includes the processing steps carried out by the host subsystem 300, while process 401 includes the processing steps carried out by the audio subsystem 301.

Process 400 begins at step 402, in which the user initiates the playing of an audio track. The playing of the audio track may be initiated by the selection of a particular music or audio/video file or may be initiated by the selection of a particular Internet web page, for example.

At step 404, the CPU 304 reads a large block of audio data from storage device (e.g., 336) and writes the data into memory, such as the volatile memory 338. The large block of audio data may include several minutes of audio data made up of a single audio track, several audio tracks or even part of an audio track. Additionally, the audio data may originate from a wide variety of sources. For example, audio data may originate from a storage device such as the storage memory 336, or may stream from the Internet via the Internet communications device 316. After reading the large block of data (e.g., from non-volatile storage 336) and writing the data into memory, the CPU 304 creates DMA transfer instructions in volatile memory 338 which provides DMA controller 302 with a description of the block of audio data, sends the DMA transfer instructions to DMA controller 302, and initiates a DMA transfer.

Next, at step 406, the CPU 304 enters into a low power state. Those of ordinary skill in the art will recognize several known methods for achieving a low power state. For example, the CPU 304 may switch off some or all of its internal circuitry by electrically decoupling the circuitry from the main power source. Alternatively, some or all of the CPU 304 may stop its clocks using a clock gating technique, which will be known to those of ordinary skill in the art. During step 406, the CPU 304 may also power down various other electronic components within the electronic device 100 that are not used for playing the selected audio. In some embodiments, at least one data channel within the CPU 304, such as an interrupt channel, remains active so that the CPU 304 can be triggered to resume normal operation through the data channel. In this way, the CPU 304 may be triggered to resume normal operation upon detection of a certain event, such as the initiation of an incoming or outgoing phone call, for example.

Next, at step 408, while the CPU 304 remains in a low power state, the main DMA controller 302 transfers audio data from the volatile memory 338 to the audio subsystem 301 via the subsystem interface 320 in accordance with the DMA transfer instructions. The main DMA controller 302 may be configured to transfer as much audio data as the RAM in the subsystem interface 320 can hold, which may be up to several seconds worth.

Next, at step 410, the main DMA controller 302 sends a signal to the Audio DSP 330 indicating that data is available in the subsystem interface 320. The sending of this signal, or handshake, triggers the parallel process 401, wherein the audio DSP 330 processes the audio data independently of the host subsystem 300, which will be described further below.

Next, process 400 advances to step 412, wherein both the main DMA controller 302 and the volatile memory 338 enter a lower power state. As with the CPU 304, the low power state of the main DMA controller 302 may be implemented by electrically decoupling the main DMA controller 302 from its power supply, through clock gating, or by any other power-saving technique known by those of ordinary skill in the art. If any portion of the audio to be played is still in the volatile memory 338, waiting to be transferred, the low power state of the volatile memory 338 is implemented by any technique, which preserves the data contained in volatile memory. For example, if the volatile memory 338 is implemented using dynamic RAM (DRAM) technology, then volatile memory 338 may be placed into a self-refresh mode.

At this time, unless a parallel task is being carried out by the CPU 304, the audio subsystem 301 is substantially the only component within the electronic device 100 that is fully powered. As will be discussed in relation to process 401, the audio subsystem 301 may continue to draw audio data from the subsystem interface 320 independently of the host subsystem 300 and process 400. The host subsystem 300 may, therefore, power up and send new audio data to the subsystem interface 320 before the subsystem interface 320 runs out of audio data.

Accordingly, at step 414, a determination is made as to whether the audio data stored in the subsystem interface 320 has fallen below a specified threshold. If the audio data is not below the specified threshold, the main DMA controller 302 remains in the low power state, as indicated at step 416. If however, the audio data is below the specified threshold, a process is initiated by which the next portion of the selected audio track is loaded into the subsystem interface 320. In some embodiments, step 414 is executed periodically after a specified amount of data has been transferred from the subsystem interface 320 to the audio DSP 330.

After the audio data stored in the subsystem interface 320 falls below the threshold, the process advances to step 418, at which stage the subsystem interface 320 sends a DMA request to the main DMA controller 302, causing the main DMA controller 302 to power up and resume normal operation. Next, at step 420, a determination is made as to whether the main DMA controller 302 has reached the end of the DMA transfer instructions. If the main DMA controller 302 is not at the end of the DMA transfer instructions, process 400 then advances to step 408, in which case the main DMA controller 302 transfers more audio data to the subsystem interface 320, sends a handshake signal to the audio DSP 330, and goes back into low power state (steps 408, 410 and 412). If the main DMA controller 302 is at the end of the descriptor, this indicates that all of the audio data stored in host memory by the CPU 304 at step 404 has been transferred to the audio subsystem 301. Therefore, if the main DMA controller 302 has reached the end of the DMA transfer instructions, process 400 advances to step 422 to begin the process of loading another block of audio data.

At step 422, the main DMA controller 302 sends an interrupt command to the CPU 304, thereby causing the CPU 304 to power up and resume normal operation. Next, at step 404, the CPU 304 repeats the process detailed above. Namely, the CPU 304 writes another large block of audio data into memory, creates DMA transfer instructions in volatile memory 338, initiates a DMA transfer (step 404) and drops back into a low power state (step 406). In embodiments of the present invention, the new block of audio data may be the remainder of a particular song that was selected by the user, or alternatively, the new audio data may be from a new song, such as for example, the next song stored in memory, or the next song in a list of songs specified, in some way, by the user.

Turning now to process 401, the processing of the audio data within the audio subsystem 301 will be described. Process 401 begins at step 424, wherein the audio DSP 330 waits for audio data to become available at the subsystem interface. The handshake signal sent by the main DMA controller 302 at step 410 triggers process 401 to advance from step 424 to step 426.

At step 426, the audio DSP 330 moves the audio data from the subsystem interface 320 to the audio DSP 330 memory, such as the input buffer 329. In some embodiments, as will be explained further below, the data transfer may not occur immediately if the audio DSP 330 is busy processing a higher priority task, such as processing and routing of real-time telephone audio. Otherwise, the audio data transfer will occur as soon as the subsystem interface 320 contains a specified amount of audio data.

Next, at step 428 the audio data transferred to the input buffer 329 of the audio DSP 330 is processed by the core processor 333 of the audio DSP 330, such as by decoding, equalizing and/or mixing the audio data. For example, the audio DSP 330 will typically decode the audio data to convert the audio data into a format recognized by the CODEC 334. The decoding process is usually necessary because, in some embodiments, the audio data is transferred to the audio subsystem 301 in a compressed format and must, therefore, be decompressed before being sent to the CODEC 334. For another example, the audio DSP 330 may also have to equalize the audio data. The equalization process may be necessary to correct for signal distortion introduced by CODEC 334, microphone 110, or speaker 111. For yet another example, the audio DSP 330 may mix two audio data streams together before sending them to the CODEC 334. The mixing process provides a means of incorporating a wide variety of audio features into the electronic device 100. For example, interface sounds may be sent by the CPU 304 and mixed with playing music, or audio may be faded smoothly between music tracks. Additionally, because the telephone audio and music audio are both handled by the audio subsystem 301, various audio effects, which combine telephone and music audio, may be realized. For example, in one embodiment, music and telephone audio may be mixed to create a smooth fading between the music and telephone audio upon the initiation of a phone call. In another embodiment, music and telephone audio may be mixed to create background music that plays at a lower volume throughout a telephone conversation.

As stated above, the audio data may not be immediately processed if a higher priority task is currently using the core processor 333 of the audio DSP 330. Consequently, if the input buffer 329 of the audio DSP 330 becomes full, the subsystem interface 320 will stop sending audio data to the audio DSP 330, resuming only when the input buffer 329 can handle new data. As stated above, embodiments of the present invention include scheduling hardware and scheduling software running in the program memory of the audio DSP 330 that selects which task gets processed at any time, given the assigned priority of the task. When the scheduler selects the audio data for processing step 428 may execute. The playing of audio data may, therefore, pause at step 428 while a higher priority task is completed. For example, if an incoming call is initiated while an audio track is playing, process 401 will pause at step 428, resuming when the phone call has ended.

Next, at step 430, the audio DSP 330 stores the processed audio data in audio output buffer 331 and routes the processed audio data from the output buffer 331 to the CODEC 334. The CODEC 334, as discussed above, then converts the digital audio data into an analog signal and sends the analog audio signal to an output device such as a speaker or headphone. Alternatively, depending on the type of audio and/or the user's selection, the audio DSP 330 may send the processed audio to a peripheral audio device other than the CODEC 334. For example, the audio DSP 330 may route data to the audio/video interface 326 or an SPDIF interface.

In some embodiments of the present invention, steps 424, 426, 428 and 430 repeat until all of the audio data transferred to the subsystem interface 320 is processed and played, i.e. routed to the output device. It should be noted that, in the presently described embodiment, audio data sent to the audio subsystem 301 does not have access to a return path back to the host subsystem 300; therefore, audio data sent to the audio subsystem is no longer visible to the host subsystem 300, including the CPU 304. Furthermore, process 400 may repeat until all of the audio data selected by the user has been processed by the audio subsystem 301 and played, or until the process has been cancelled by the user.

Turning now to FIG. 5, a method of processing telephone audio in accordance with an embodiment of the present invention is depicted. Process 500 starts at step 502 with the initiation of a telephone call. The telephone call may be an incoming call or an outgoing call initiated by the user. In embodiments of the present invention, step 502 is triggered when the user has committed to making or receiving a telephone call. by either dialing a call or pressing the "answer" button.

Next, at step 504, the host subsystem 300 enters a low power mode. The host subsystem 300 may include the CPU 304, the main DMA controller 302, the storage memory 336, the volatile memory 338, and/or any other component connected to the main bus 326 that is not part of the audio subsystem 301. In this way, only those components used for the processing of telephone audio are fully powered. As stated above, the low power mode may be implemented using any techniques known on the art, such as clock gating. Additionally, although process 500 depicts the host subsystem 300 as remaining in low power mode for the duration of the telephone call, the host subsystem 300 or some part thereof, such as, for example, the CPU 304, may resume normal operation if triggered to do so. For example, if the user selected music audio or a sound clip to play during a telephone conversation, the host subsystem 300 may resume normal operation to deliver the selected audio to the audio subsystem 301. Additionally, the host subsystem 300 may not go into low power state at all if host subsystem 300 has been configured by the user to carry out a parallel process during the processing of telephone audio.

Next, at step 506, it is determined whether the baseband radio 322 and the CODEC 334 are "ready," meaning that they are ready to send and receive audio data. The test for the "ready" condition may be physically implemented by any means known in the art. For example, the CODEC 334 may include an output buffer, which holds data to be sent to the output audio device, and an input buffer, which holds data that has been received by the audio input device and will be sent to the audio DSP 330 for processing. Similarly, the baseband radio 322 may include an output buffer, which holds outgoing data to be transmitted, and an input buffer, which holds incoming data that has been received by the baseband radio 322 and will be sent to the audio DSP 330 for processing. In an embodiment of the present invention, the "ready" condition may signify that both output buffers contain a specified number of empty memory spaces and that both input buffers contain a specified number of audio samples. If all four of the buffers indicate a "ready" state, then a transfer of data may take place and process 500, therefore, advances to step 508. Waiting for all four of the buffers to indicate a "ready" state simplifies subsequent processing, since subsequent processing steps can assume that any input data is available, and space for any output data is available; it is not necessary to check for the presence of input data, or the availability of output buffer space, as the processing proceeds. In other embodiments, the presence of input data and the availability of output buffer space are separately determined by the audio DSP 330 during processing.

Step 506 prioritizes the processing of real-time telephone audio, while also allowing efficient use of the audio DSP's 330 core processor 333. As long as telephone audio is waiting to be processed and the telephone related circuitry is capable of handling new data, the audio DSP 330 circuitry will be applied to processing telephone audio. Prioritizing the real-time telephone audio helps to ensure that telephone audio is processed quickly, thereby avoiding delays in telephone audio that may be forbidden by regulations and/or undesirable to the user. There may be short periods of time, however, when the telephone circuitry cannot make use of the audio DSP 330. This may happen, for example, if the output buffers of the baseband radio 322 or the CODEC 334 are full or close to full, or if the input buffers of the baseband radio 322 or the CODEC 334 are empty or close to empty. Rather than allow the audio DSP 330 to remain idle during these times, embodiments of the present invention include a process by which the audio DSP 330 processes other tasks when the baseband radio 322 or the CODEC 334 are not in a "ready" state. As such, process 500 may branch at step 506, thereby proceeding to step 520 if either the baseband radio 322 or the CODEC 334 are not in a "ready" state.

If all four of the buffers indicate a "ready" state, process 500 advances to step 508. At step 508, a request is made to the audio DSP 330. In one embodiment, the request is a DMA request, and the request is implemented by DMA request circuitry that includes a set of four data lines each coupled to one of the four buffers and configured to indicate whether the buffer is in a "ready" state. The four data lines may be further coupled to the input of an "and" gate, with the output of the "and" gate coupled to a DMA request input line included in the audio DSP 330. In another embodiment, the request is an interrupt request, and the request is implemented by interrupt request circuitry that includes a set of four data lines each coupled to one of the four buffers and configured to indicate whether the buffer is in the "ready" state. The four data lines may be further coupled to the input of an "and" gate, with the output of the "and" gate coupled to an interrupt request input line included in the audio DSP 320.

Next, at step 510, telephone audio data is transferred from the input buffers of the CODEC 334 and the baseband radio 322 to the input buffers 329 of the audio DSP 330. In one embodiment, the audio DSP 330 includes at least two input buffers, and the transfer of data from the CODEC 334 and the baseband radio 322 occurs simultaneously. In one embodiment, where the request was a DMA request, the transfer would be performed by a DMA controller in response to the DMA request. In another embodiment, where the request was an interrupt request, the transfer would be performed by programmed I/O operations generated by software running on audio DSP 330 in response to the interrupt request.

Next, at step 512, telephone audio is taken from the input buffers 329 of audio DSP 330, processed by the audio DSP 330, and sent to an output buffer 331 of the audio DSP 330. Examples of such processing may include decoding or encoding of incoming or outgoing transmissions, equalization of telephone audio and digital mixing of different audio data streams. Those of ordinary skill in the art will recognize methods of carrying out the above described processes.

Next, at step 514, the audio DSP 330 may mix other audio samples into the telephone audio. For example, the CPU 304 may cause a user interface sound such as a beeping or ringing sound to be mixed with telephone audio as an indication of another incoming call. For another example, decoded music audio may be mixed with telephone audio, so that decoded music audio plays in the background of the incoming and/or outgoing telephone audio. In order to mix decoded music audio with telephone audio, the sample rate of the music audio may be converted by the audio DSP 330 to match the sample rate of the telephone audio, as will be appreciated by those of ordinary skill in the art.

Next, at step 516, telephone audio data is sent to the output buffers of the broadband radio 322 and the CODEC 334. In the embodiment presently described, the transfer of data to the CODEC 334 and the baseband radio 322 occurs simultaneously. Therefore, according to one embodiment, the audio DSP 330 also includes at least two output buffers 331. In one embodiment, the transfer would be performed by a DMA controller. In another embodiment, the transfer would be performed by programmed I/O operations generated by software running on audio DSP 330.

Next, at step 518, the baseband radio 322 transmits the outgoing audio data, and the CODEC 334 sends the incoming audio data to an output device, such as a speaker. Those of ordinary skill in the art will recognize techniques for carrying out the processes described in step 518.

In embodiments of the present invention, steps 506 through 518 repeat at a rate, which is determined by the rate at which the baseband radio and the codec become "ready," until all of the incoming and outgoing audio data are processed and the telephone call ends. Once the telephone call ends, the host subsystem 300 comes out of low power mode and resumes normal operation. As stated above, the host subsystem 300 may resume normal operation even while a telephone call is ongoing, if triggered to do so. Additionally, the host subsystem 300 may also stay in low power mode after the termination of the telephone call if there is no subsequent task waiting to be processed by the host subsystem 300.

Returning to step 506, as stated above, if one of the four buffers does not indicate a "ready" state, process 500 will advances to step 520. At step 520, the audio DSP 320 may perform some other short processing task, such as decoding a segment of audio data that has been transferred from the subsystem interface 320, or processing user interface sound data sent by the CPU 304 to alert the user of another incoming call or a low battery condition, etc. The processing that takes place at step 520 will be brief enough that the next scheduled execution of telephone audio processing is not significantly delayed. Because the audio DSP processes data in small task segments, as discussed above, step 520 will finish and process 500 will return to step 506 quickly. The audio data processed during step 520 may eventually be mixed with telephone audio during step 514.

Turning now to the enhanced security attributes of the present invention, embodiments of the present invention include techniques for enhancing the security of copyrighted audio through encryption. Examples of such encryption techniques are discussed in the copending and commonly assigned U.S. patent application Ser. No. 12/060,728, filed Apr. 1, 2008, entitled "Central DMA with Arbitrary Processing Functions," which is hereby incorporated by reference in its entirety. Briefly stated, copyrighted audio data loaded into the electronic device 100 may be stored in memory in encrypted form, thereby rendering any unauthorized copies that may be downloaded from the electronic device 100 inoperable. The electronic device 100 is, therefore, equipped with decryption hardware and/or software so that encrypted audio files may be decrypted before playing. Some decryption processes could, however, present an opportunity for a hacker to download the un-encrypted audio file from a memory location in the electronic device 100 such as the internal registers of the CPU 304 or the volatile memory 338. It is therefore beneficial to use a decryption process in which the decrypted audio data does not appear in a memory location that is accessible to CPU 304. To achieve this, the encryption techniques discussed in U.S. patent application Ser. No. 12/060,728 cause the decryption of audio data to occur simultaneously with the sending of audio data from memory to the buffers of the target DMA device.

In embodiments of the present invention, the above-referenced encryption/decryption techniques are employed in the electronic device 100, to enhance the security of copyright protected material. For example, decryption of encrypted audio data may be performed by the main DMA controller 302 as part of the process of transferring the audio to the subsystem interface 320. In this way, decrypted audio data appears on the main bus 314 and within the audio subsystem 301, but not in a memory location to which the CPU 304 has access. The CPU 304 does not have access to the audio sent to the audio subsystem 301, because embodiments of the present invention are configured to only allow one way transmission of decoded audio data to the audio subsystem 301. In other words, the audio subsystem 301 will appear to the CPU 304 as an output device coupled to the main bus, to which compressed audio data is sent to be processed and played. This functionality is achieved, in part, by the audio DSP 330, which not only decompresses compressed audio, but also equalizes, mixes and routes audio data to the CODEC 334, thereby eliminating the CPU 304 from processes involving the handling of decoded audio data.

Therefore, in embodiments of the present invention the CPU 304 has limited access to the resources within the audio subsystem 301 including the audio DSP 330. This limited access is achieved by the design of the subsystem interface 320. The subsystem interface 320 is configured such that, during operation of the electronic device 100, the CPU 304 has access only to the host side of the subsystem interface 320, which, as discussed above, allows CPU 304 to access only a subset of the resources within audio subsystem 301. For example, in one embodiment, the subsystem interface 320 is configured to allow access to only a portion of the volatile memory included in audio DSP 330, including input buffer 329 and one or more control and/or status registers. The bulk of the volatile memory included in the audio subsystem 301 is, therefore, not accessible to the CPU 304. Embodiments of the present invention, therefore, make it difficult for a hacker to create unauthorized copies of copyrighted material, because the CPU 304 does not have access to decrypted audio data.

Additionally, to inhibit the ability of a hacker to load unauthorized software on the device 10, the host subsystem 300 may periodically perform an audit of the software loaded in each of the devices coupled to the main bus 300. Because the audio subsystem 301 does not have access to the main bus 300, none of the code in the audio subsystem 301 needs to be considered. This saves in processing time required for the audit.

Although the host subsystem 300 has limited access to the audio subsystem 301, it may also be necessary for the host CPU 304 to temporarily have broad access to the audio subsystem 301 when the electronic device 100 is initially powered up. This temporary access may allow the CPU 304 to load certain initialization data used by the audio subsystem 301. For example, the CPU 304 may load the scheduler software that runs on the audio DSP 330 when the electronic device 100 is powered up. Additionally, the CPU may also provide initialization data to other components on the audio bus when the electronic device 100 is powered up. In order to load the audio DSP 330 software and other initialization data, the CPU 304 has temporary broad access, during a brief initialization stage, to the memory address space contained in the audio DSP 330, the subsystem interface 320, and any other component to be serviced by the CPU 304 on powering up. However, to maintain the security of decrypted audio, the CPU's 304 access to the internal resources of audio subsystem 301 using the subsystem interface 320 is subsequently restricted after the brief initialization stage.

To maintain the security of the audio subsystem 301 while still allowing the CPU 304 to load software and initialization data, an embodiment of the present invention includes a security mechanism built into the subsystem interface 320. The security mechanism allows the subsystem interface 320 to operate in one of two modes: "insecure mode" and "secure mode." In "insecure mode," the CPU 304 has full access to the internal resources of the audio subsystem 301 using subsystem interface 320. In "secure mode" CPU 304 has restricted access to the internal resources of the audio subsystem 301 using subsystem interface 320. The subsystem interface 320 is forced into "insecure mode" when the electronic device 100 is powered up, and software can explicity switch the subsystem interface 320 from "insecure mode" to "secure mode", but there is no way (other that powering the electronic device 101 down and up) to return to "insecure mode."

Figure 6:
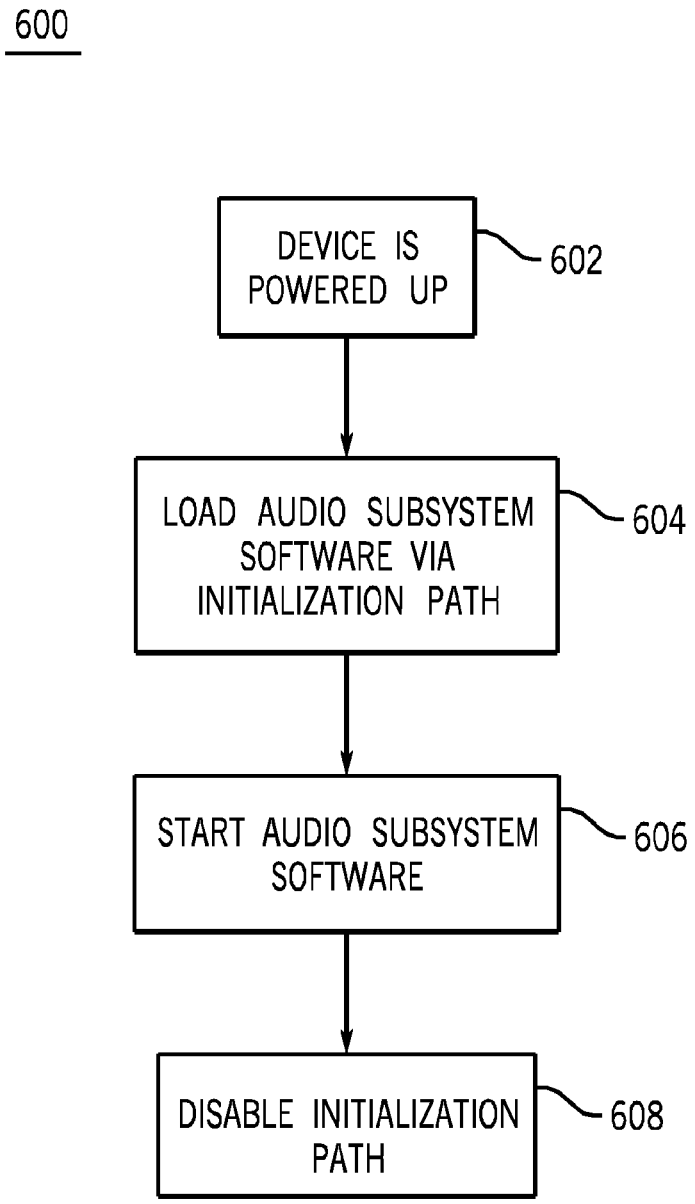
FIG. 6 is a flow chart demonstrating a security mechanism in accordance with an embodiment of the present invention.

FIG. 6 depicts the operation of a security mechanism built into the subsystem interface 320, in accordance with an embodiment of the present invention. Method 600 starts when the electronic device 100 is powered up at step 602. Immediately upon powering up, the CPU 304 runs trusted code, code that is known to be safe and uncorrupted. An example of trusted code is code that is loaded from read only memory (ROM) located on the same integrated circuit that contains CPU 304.

Next, at step 604, the trusted CPU code loads software into the program memory space of the audio DSP 330 through the subsystem interface 320. During step 604, the CPU 304 may also optionally load any other initialization data or software used by other components in the audio subsystem 301. During step 604, the CPU 304 may have unrestricted access to substantially all of the memory address space available on the audio DSP 330, the subsystem interface 320, and any other component attached to the audio bus 328.

Next, at step 606, after all initialization data is loaded, the audio subsystem software is started. After the audio subsystem software is started, the initialization path is disabled at step 608. In one embodiment, disabling the initalization path means switching subsystem interface 320 from "insecure mode" to "secure mode." In one embodiment, the audio DSP 330 itself disables the initialization path according to the software loaded by the CPU 304. In other embodiments, the initialization path is disabled by the CPU 304. When the initialization path is disabled, the CPU 304 no longer has unrestricted access to the internal resource of the audio subsystem 301. For example, after the initialization path is disabled, the CPU 304 may only access the portion of the volatile memory included in audio DSP 330 that includes input buffer 329 and one or more control and/or status registers. Once the initialization path is disabled, an attempt by the CPU 304 to access a restricted memory address simply returns an error. Furthermore, once the initialization path is disabled, it cannot be enabled again, other than by turning the electronic device 100 off and on again, in which case, process 600 repeats.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

[1. A digital signal processor, comprising:

a core processor configured to process audio data;

at least one input buffer coupled to the core processor, the at least one input buffer configured to receive audio data from at least one audio input device;

at least one output buffer coupled to the core processor, the at least one output buffer configured to send processed audio data to at least one audio output device; and a programmable memory configured to interface with the core processor to control the routing of audio data segments from the at least one input buffer to the at least one output buffer, wherein controlling the routing of the audio data segments comprises determining an order in which the audio data segments are processed by the core processor and routed to the output buffer.]

[2. The digital signal processor of claim 1, wherein the programmable memory is configured to interface with the core processor to assign a priority level to each of the audio data segments.]

[3. The digital signal processor of claim 1, wherein the programmable memory is configured to interface with the core processor to control the routing of audio data from the at least one audio input device to the at least one input buffer.]

[4. The digital signal processor of claim 1, wherein the programmable memory is configured to interface with the core processor to control the routing of processed audio data from the at least one output buffer to the at least one audio output device.]

[5. The digital signal processor of claim 1, wherein the core processor is configured to mix two or more audio samples; sample rate convert audio data; equalize audio data; compress or decompress audio data; encrypt or decrypt audio data; or some combination thereof.]

[6. The digital signal processor of claim 1, wherein the at least one audio input device comprises one or more microphones, a headset, or a combination thereof.]

[7. The digital signal processor of claim 1, wherein the at least one audio output device comprises a speaker, a headphone, a headset, or a combination thereof.]

[8. The digital signal processor of claim 1, wherein the at least one input buffer is configured to receive the audio data from the at least one audio input device comprising first receiving the audio data from a CODEC, wherein the CODEC is configured to convert the audio data into digital audio data.]

[9. The digital signal processor of claim 8, wherein the CODEC comprises dual communication channels, and wherein the CODEC is configured to convert the audio data into digital audio data and convert the processed audio data into analog audio data substantially simultaneously.]

[10. The digital signal processor of claim 1, wherein the at least one output buffer is configured to send the processed audio data to the at least one audio output device comprising first sending the processed audio data to a CODEC, wherein the CODEC is configured to convert the processed audio data into analog audio data.]

11. A method of processing audio data via a digital signal processor (DSP), comprising:

receiving audio data into an input buffer;

partitioning the audio data into audio data segments via a programmable memory configured to interface with a core processor of the DSP, wherein the audio data segments correspond to a plurality of audio processing task segments;

assigning a respective priority level to each of the plurality of audio processing task segments;

processing each audio processing task segment of the plurality of audio processing task segments via the core processor according to the respective priority level of each of the plurality of audio processing task segments; and storing the audio data segments into an output buffer.

12. The method of claim 11, wherein receiving the audio data comprises receiving telephone audio data, music audio data, or a combination thereof.

13. The method of claim 11, wherein processing each audio processing task segment of the plurality of audio processing task segments comprises performing audio data compression, audio data decompression, audio data equalization, audio data mixing, or a combination thereof.

14. The method of claim 11, wherein assigning the respective priority level to each of the plurality of audio processing task segments comprises assigning a priority level according to a respective sampling rate of each of the plurality of audio processing task segments.

15. The method of claim 14, wherein assigning the priority level according to the respective sampling rate comprises determining a first sampling rate when the audio data segments comprise telephone audio data and determining a second sampling rate when the audio data segments comprise music audio data, wherein the first sampling rate is less than the second sampling rate.

16. The method of claim 11, wherein assigning the respective priority level to each of the plurality of audio processing task segments comprises assigning a priority level to telephone audio data according to a respective processing time delay associated with the telephone audio data.

[17. An electronic device, comprising, a digital signal processor (DSP), comprising:

an input buffer configured to receive audio data;

a programmable memory configured to interface with a core processor of the DSP to:

partition the audio data into audio data segments, wherein the audio data segments correspond to a plurality of audio processing task segments; and assign a respective priority level to each of the plurality of audio processing task segments;

wherein the core processor is configured to process each audio processing task segment of the plurality of audio processing task segments according to the respective priority level of each of the plurality of audio processing task segments; and;

an output buffer configured to store the audio data segments.]

[18. The electronic device of claim 17, wherein the DSP is configured to switch between the plurality of audio processing task segments based at least in part on whether the audio data segments comprise one of telephone audio data or music audio data.]

[19. The electronic device of claim 17, wherein programmable memory is configured to interface with the core processor to assign a higher priority level to the telephone audio data than the priority level assigned to the music audio data.]

[20. The electronic device of claim 17, wherein the core processor is configured to process each audio processing task segment of the plurality of audio processing task segments by processing a first segment of telephone audio data samples, a second segment of music audio data samples, or a combination thereof.]

21. The method of claim 11, wherein partitioning the audio data into audio data segments comprises dividing each of the plurality of audio processing task segments into a series of smaller task segments to increase a speed at which each of the plurality of audio processing task segments is processed.

* * * * *